United States Patent [19]
Tomoji

[11] Patent Number: 4,761,760
[45] Date of Patent: Aug. 2, 1988

[54] DIGITAL ADDER-SUBTRACTER WITH TENTATIVE RESULT CORRECTION CIRCUIT

[75] Inventor: Nukiyama Tomoji, Tokyo, Japan

[73] Assignee: NEC Corporation, Tokyo, Japan

[21] Appl. No.: 767,013

[22] Filed: Aug. 19, 1985

[30] Foreign Application Priority Data

Aug. 17, 1984 [JP] Japan ................. 59-171074

[51] Int. Cl.[4] ............................. G06F 7/50
[52] U.S. Cl. ....................... 364/788; 364/787
[58] Field of Search ................. 364/788, 787

[56] References Cited

U.S. PATENT DOCUMENTS

| | | | |
|---|---|---|---|
| 3,316,393 | 4/1967 | Ruthazer | 364/788 |
| 3,993,891 | 11/1976 | Beck et al. | 364/788 |
| 4,139,894 | 2/1979 | Reitsma | 364/788 |
| 4,203,157 | 5/1980 | Daniels | 364/788 |
| 4,525,797 | 6/1985 | Holden | 364/788 |
| 4,639,888 | 1/1987 | Nussbaecher | 364/788 |

OTHER PUBLICATIONS

Richards, *Arithmetic Operations in Digital Computers*, D. Van Nostrand Company, Inc., 1955, pp. 113–114.

Primary Examiner—David H. Malzahn
Attorney, Agent, or Firm—Sughrue, Mion, Zinn Macpeak & Seas

[57] ABSTRACT

For reduction in circuit complexity, there is disclosed a high speed digital arithmetic unit comprises a plurality of binary adders in cascade arrangement, each binary adder comprising carry lookahead means for generating a carry signal representative of an actual carry bit based on a segment of a first binary number, a corresponding segment of a second binary number and a carry signal fed from an adder located at a lower position, adding means for adding the segment of the first binary number to the corresponding segment of the second binary number in parallel operation with the carry lookahead means, the adding means simultaneously adding a suspense carry to a partial sum of the segments for generation of a temporary result, and final result determination means operative to generate a final result based on the partial sum in accordance with the actual carry fed from the lower adder.

5 Claims, 3 Drawing Sheets 4,761,760

DIGITAL ADDER-SUBTRACTER WITH TENTATIVE RESULT CORRECTION CIRCUIT

FIELD OF THE INVENTION

This invention relates to a high speed digital arithmetic unit incorporated in a computer system and more particularly to an improved binary adder with a carry lookahead circuit.

DESCRIPTION OF PRIOR ART

One of the basic requisites to a computer system for real time digital signal processing is high operation speed, especially, high execution speeds in the central processing unit. Many attempts have been made to speedup arithmetic operations based on a strategy to reduce a time associated with carry propagation. One way to reduce the carry propagation time is to generate an input carry bit of a stage directly from inputs to preceding stages rather than allow carries to ripple from stage to stage. Adders designed using this principle are called "carry lookahead adders" (CLA).

A fairly high speed processing unit is obtained by employment of the carry lookahead adders, however, in case of some applications there is an unceasing demand to speedup the arithmetic operations for high throughput. One of the speedup method for the processing unit with the carry lookahead adders is to duplicate logic circuits for arithmetic operations, wherein one group of the logic circuits carries out arithmetic operations assuming a generation of a carry bit from the proceding stage, and, on the other hand, the other group of the logic circuits concurrently performs the same arithmetic operations assuming that the proceding stage generates no carry, thereafter selecting a final result from the two candidates based on an actual carry from the proceding stage. This speedup method was realized in the combination of the carry lookahead adders and carry selection adders (CSLA) disclosed in "ISSCC DIGEST OF TECHNICAL PAPERS", 1984, pages 84 and 85.

Duplication of the logic circuits is conductive to reduction of each operation time, however, another problem has been encountered in complexity of circuits.

It is therefore an object of the invention to provide an improved high speed digital arithmetic unit with simple configuration.

SUMMARY OF THE INVENTION

In accordance with the present invention, there is provided a digital arithmetic unit for first and second binary numbers comprising a plurality of adders each having carry lookahead means for generation of an actual carry, and adding means for generation of a temporary result, and final result determination means for generation of a final result. The first and second binary numbers are subdivided into a plurarity of segments, respectively, which are paired off for application to the respective adders. The paired segments are fed to both the carry lookahead means and the adding means for parallel operations. The carry lookahead means carry out the paired segments together with an actual carry fed from an adder located at a lower position thereof for generation of the actual carry. On the other hand, the adding means perform an adding operation on the paired segments and a suspense carry, thereby generating the temporary result which is further carried out together with the actual carry from the lower adder by the final result determination means for generation of the final result based on the temporary result in accordance with the actual carry fed from the lower adder.

When the suspense carry is equal in value to the actual carry fed from the lower adder, the final result determination means allow the temporary result to be the final result in the presence of the actual carry fed from the lower adder. On the contrary, the final result determination means decrease the temporary result to the sum of the paired segments in the absence of the carry signal fed from the lower adder.

If the suspense carry is selected to be value 1, the final result determination means allow the temporary result to be the final result in the presence of the carry signal from the lower adder. However, the final result determination means produce the final result which is smaller in value than the temporary result by "1" in the absence of the carry signal.

Each of the segments may be constituted by a predetermined number of bits, for example, four bits. If the second number is the complement of a certain number, the arithmetic unit performs a subtraction.

BRIEF DESCRIPTION OF THE DRAWINGS

The features and advantages of the present invention will be more clearly understood from the following description taken in conjunction with the accompanying drawings, in which.

DETAILED DESCRIPTION OF THE PREFERRED EMBODIMENTS

Figure 1:
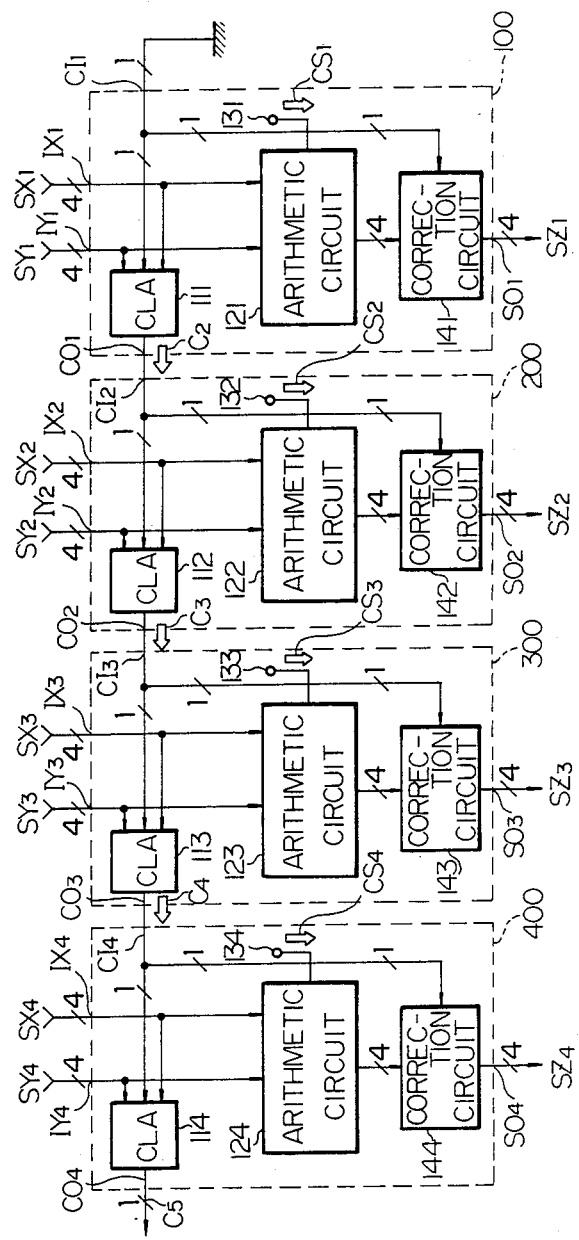
FIG. 1 is a block diagram of a preferred embodiment according to the present invention.

Referring to FIG. 1 of the drawings, a digital arithmetic unit according to the present invention is shown and generally indicated at 1. The arithmetic unit 1 is constituted by first, second, third and fourth 4-bit binary adders 100, 200, 300 and 400 so that the arithmetic unit carries out an adding operation or, if necessary, a subtracting operation on two 16-bit binary numbers $X_0, \ldots, X_{15}$ and $Y_0, \ldots, Y_{15}$. The two 16-bit binary numbers $X_0, \ldots, X_{15}$ and $Y_0, \ldots, Y_{15}$ being performed by subdividing the numbers into segments $SX_i$ and $SY_i$, respectively, where $i=1,2,3$ or 4, representing bits executed in the first, second, third or fourth binary adder, each binary adder 100, 200, 300 or 400 is provided with two sets of 4-bit input terminals $IX_j$ and $IY_j$, where $j=1,2,3$ or 4, representing an element of the first, second, third or fourth binary adder. (Hereinafter the legends i and j are used in the same meanings as described above) Each binary adder 100, 200, 300 or 400 further has 4-bit output terminals $SO_j$, and carry input and carry output terminals $CI_j$ and $CO_j$ connected, in cascade arrangement, to one another. Namely, the four binary adders are arranged in such a manner that the binary adder handling low order bits supplies a carry bit $C_i$ to the binary adder handling high order bits. The carry input terminal $CI_1$ is connected to the ground so that no carry bit $C_1$ is applied to the first adder 100.

The input terminals $IX_j$ and $IY_j$ are connected in parallel to both input terminals of a carry lookahead circuit $11j$ and an arithmetic circuit $12j$ so as to permit of independent operations on the same segments. The carry lookahead circuit $11j$ further has an input terminal connected to the carry input terminal CIj. The carry lookahead circuit $11j$ being, thus, supplied with the two segments SXi and SYi together with the carry bit Ci, the carry lookahead circuit $11j$ determines based on the bit pattern of the two segments SXi, SYi and the carry bit Ci whether or not a new carry bit should be applied to the binary adder on its left. As a consequence, the carry lookahead circuit 114 of the fourth adder 400 finally generates a carry bit $C_5$ which is supplied to a certain logic such as a flag circuit.

In addition to the input terminals for the segments SXi and SYi, each arithmetic circuit $12j$ is provided with a node $13j$ to which a suspense carry bit CSi is applied regardless of the generation of the carry bit Ci in the carry lookahead circuit on its right. In this instance, as the suspense carry bit is represented by the binary digit 1, when the two segments SXi and SYi are provided to the arithmetic circuit $12j$, the arithmetic circuit $12j$ forms a temporary partial sum which is greater than the sum of the two segments SXi and SYi by the binary number 1.

The arithmetic circuit $12j$ has a plurality of terminals connected to corresponding input terminals of a correction circuit $14j$. Another input terminal of the correction circuit $14j$ is connected to the carry input terminal CIj thereof, thereby correcting the temporary partial sum fed from the output terminals of the arithmetic circuit $12j$ in accordance with the carry bit applied from the carry lookahead circuit $11j$ of the adder on its right.

Namely, the correction circuit $14j$ substracts the binary number 1 from the temporary partial sum in the absence of the carry bit fed from the carry lookahead circuit $11j$ of the arithmetic adder on its right, thereby generating a final partial sum and placing the final partial sum at the 4-bit output terminals SOj thereof. On the contrary, the correction circuit $14j$ does not alter the temporary partial sum in the presence of the carry bit applied thereto and places it at the output terminals SOj as the final partial sum. Thus, the two 16-bit binary numbers $X_0$ to $X_{15}$ and $Y_0$ to $Y_{15}$ are added to each other, thereby forming a total sum $SZ_1$ to $SZ_4$.

Figure 2:
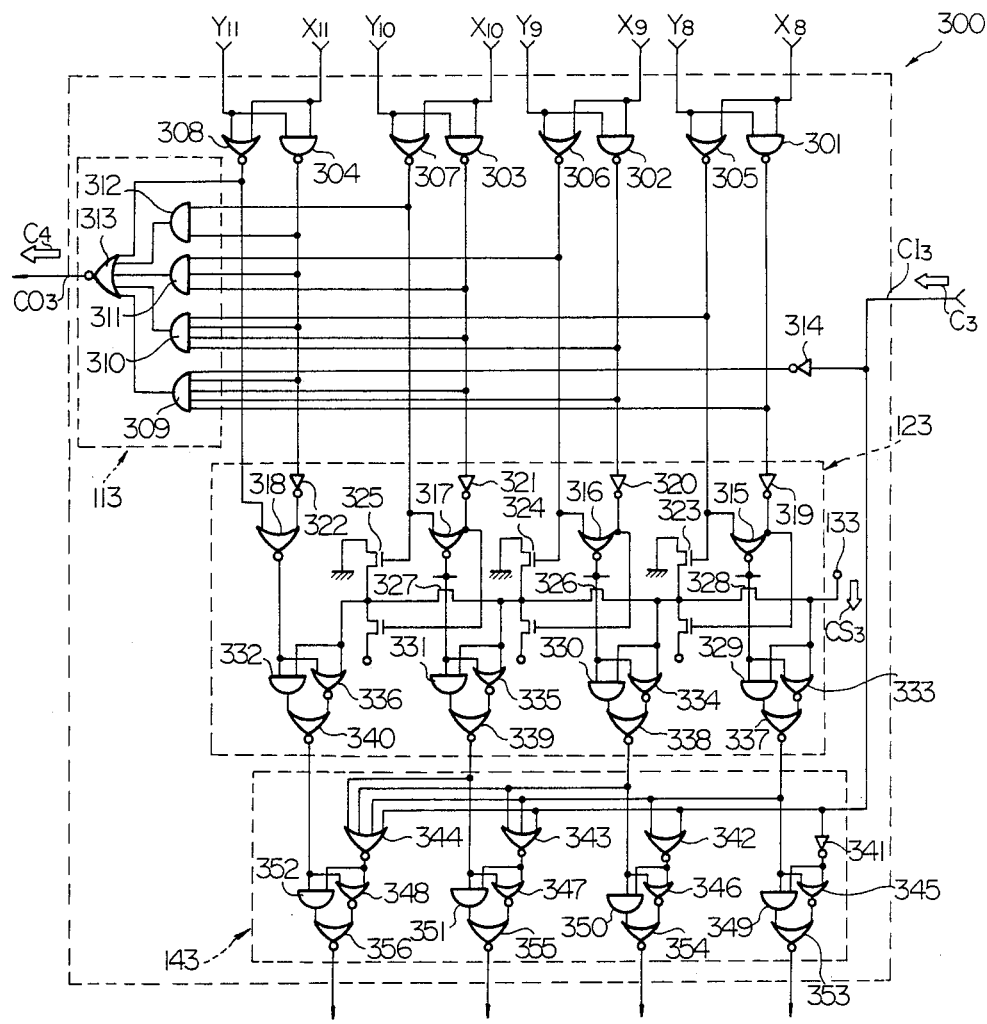
FIG. 2 is a logic diagram of an adder incorporated in the embodiment shown in FIG. 1.

Turning to FIG. 2 of the drawings, there is shown a logic diagram of the adder 100, 200, 300 or 400. The adders are similar in construction to each another so that hereinafter description are made in regard to the adder 300.

The adder 300 illustrated in FIG. 2 has four NAND gates 301 to 304 and four NOR gates 305 to 308 for preparation of an adding operation and a carry determination, each of the gates 301 to 308 having a pair of inputs and an output. The NAND gate 301 is paired with the NOR gate 305 for implementation of the logic operations on the same bits $X_8$ and $Y_8$. Likewise, the NAND gates 302 to 304 are respectively paired with the NOR gates 306 to 308 for implementation of the logic operations on the bits $X_9$ to $X_{11}$ and $Y_9$ to $Y_{11}$, respectively. Namely, the bit $X_8$ is NANDed and NORed with the bit $Y_8$ by the NAND gate 301 and the NOR gate 305. In a similar manner, the bits $X_9$ to $X_{11}$ are NANDed and NORed with the corresponding bits $Y_9$ to $Y_{11}$ by the NAND gates 302 to 304 and the NOR gates 306 to 308, respectively.

The carry lookahead circuit 113 is constituted by four AND gates 309 to 312 and a NOR gate 313. The AND gate 309 has five inputs and an output. The five inputs of the AND gate 309 are connected in parallel to the respective outputs of the NAND gates 301 to 304 and the carry input $CI_3$ through a NOT gate 314 so that when all the outputs from the NAND gates 301 to 304 are each equal to logic 1 and concurrently the carry bit $C_3$ is logic 0, then the output of the AND gate 309 is equal to logic 1. The AND gate 310 has four inputs and an output, the inputs being connected in parallel to the output of the NOR gate 305 and the respective outputs of the NAND gates 302 to 304. The inputs of the AND gate 310 being thus connected, when all the outputs of the gates 302 to 305 are each equal to logic 1, then the output of the AND gate 310 is considered to be logic 1. Likewise, the AND gate 311 has three inputs and an output, the output thereof being logic 1 if the outputs of the NOR gate 306 and the NAND gates 303 and 304 are logic 1. The output of the AND gate 312 is also concidered to be logic 1, when the NOR gate 307 and the NAND gate 304 are each equal to logic 1. The NOR gate 313 has five inputs connected in parallel to the respective outputs of the AND gates 309 to 312 and the output of the NOR gate 308 so that when all of the outputs from the AND gates 309 to 312 and the NOR gate 308 are each equal to logic 0, then the output of the NOR gate 313 is equal to logic 1. The carry lookahead circuit 113 being thus operative, the carry bit $C_4$ is generated based on the bits $X_8$ to $X_{11}$, $Y_8$ to $Y_{11}$ and the carry bit $C_3$.

The arithmetic circuit 123 comprises four NOR gates 315 to 318 each having a pair of inputs one of which is connected to the output of the NAND gate 301, 302, 303 or 304 through a NOT gate 319, 320, 321 or 322 and the other of which is directly connected to the output of the NOR gate 305, 306, 307 or 308. The arithmetic circuit 123 further comprises three means 323 to 325 each provided between a positive voltage source and the ground and having a pair of MOS transistors gates of which are connected in parallel to the outputs of the NOR gates 305 to 307 and to the outputs of the NOT gates 319 to 321, respectively. The means 323 to 325 have output nodes connected in series with one another through MOS transistors 326 and 327. The output node on the rightmost side is connected to the node 133 through a MOS transistor 328 so that each output node is capable of being supplied with the suspense carry bit $CS_3$ from the node 133 depending upon the logic states of the NOR gates 315 to 317 which drive the respective MOS transistors 326 to 328.

The arithmetic circuit 123 being thus provided with four sets of the NOT gates 319 to 322 and the NOR gates 315 to 318, the segment $SX_3$ is added to the segment $SY_3$. In detail, when both bits Xi and Yi are the same logic state, logic 1 or 0, then the output of each NOR gate 315, 316, 317 or 318 is logic 0. On the contrary, if the bits Xi and Yi are different in logic state from each other, the output of the NOR gate is logic 1 in any combination.

The arithmetic circuit 123 further comprises four AND gates 329 to 332 and eight NOR gates 333 to 340. Each AND gate has a pair of inputs one of which is connected to the output of the NOR gate 315, 316, 317 or 318 and the other of which is connected to the output node of the means 323, 324 or 325 or the node 133. The four NOR gates 333 to 336 are in parallel connection with the AND gates 329 to 332 so that the outputs of the NOR gates 315 to 318 are ANDed and NORed with the suspense carry or its complement depending upon the combination of the logic states of the NAND gates 315 to 317 and the means 323 to 325. The outputs of each AND gate and each NOR gate are respectively connected to a pair of inputs of the NOR gates 337, 338, 339 or 340, thereby producing the temporary result based on the sum of the segments SXi and SYi and the suspense carry $CS_3$. This means that the sum of the segments $SX_3$ and $SY_3$ is added to the suspense carry bit which is, in this instance, logic 1. In other words, the temporary result is greater than the sum of the segments SXi and SYi by the binary number 1.

In order to determine the final result based on the actual carry bit $C_3$, the correction circuit 143 is provided which comprises a NOT gate 341 and three NOR gates 342 to 344. The carry input $CI_3$ is connected in parallel to the input of the NOT gate 341 and one of the inputs of each NOR gate 342, 343 or 344 for feeding the carry bit $C_3$ generated by the carry lookahead circuit 112. The NOR gate 342 has one more input providing a communication to the output of the NOR gate 337. The NOR gate 343 has two more inputs providing communications to the outputs of the NOR gates 337 and 338. Likewise, the NOR gate 344 has three more inputs providing communications to the outputs of the NOR gates 337 to 339. The correction circuit 143 further comprises four NOR gates 345 to 348 and four AND gates 349 to 352, each NOR gate being paired with the corresponding AND gate for providing parallel communications with one of the NOR gates 337 to 340 and the NOT gate 341 or one of the NOR gates 342 to 344. Outputs of the paired gates 345 and 349, 346 and 350, 347 and 351 or 348 and 352 are connected to respective inputs of NOR gates 353 to 356 for producing the final result consisting of the 4-bit binary number. As the NOT gate 341 complements the carry bit $C_3$, an inversion of the logic state of the carry bit $CI_3$ causes the output of the NOR gate 353 to invert its output through the logic operations of the gates 345 and 349. The inversion of logic state of the carry bit $C_3$ also influences the logic states of the NOR gates 354 to 356.

For better understanding of the logic operations of the adder, description will be hereinafter made in regard to a typical example of segment set. Assuming now that the segment $SX_3$ and $SY_3$ are represented by the binary numbers (1111) and the binary number (0000), each NAND gate 301, 302, 303 or 304 provides logic 1, on the other hand, the outputs of the NOR gates 305 to 308 are each equal to logic 0. As the outputs of the NAND gates 301 to 304 are inverted by the respective NOT gates 319 to 322 to logic 0, a pair of logic 0s are applied to the respective inputs of each NOR gate 315, 316, 317 or 318, thereby forming logic 1 through the NOR operation. A pair of control gates of each means 323, 324 or 325 being supplied with logic 0 from the NOR gate 305, 306 or 307 and the NOT gate 319, 320, or 321, respectively, logic 1 can appear at the output node of each means. Logic 1s are applied to all the gates of MOS transistors 328, 326 and 327 from the NOR gates 315 to 317 so that all the transistors are turned on. The suspence carry is thus propagated from the node 133 to all the output nodes of the means 323 to 325. As a result of this situation, logic 1s are applied to all the inputs of the AND and NOR gates 329 to 336, thereby producing logic 1 in each AND gate 329, 330, 331 or 332 and logic 0 in each NOR gate 333, 334, 335 or 336. Logic 1 from each AND gate 329, 330, 331 or 332 and logic 0 from each NOR gate 333, 334, 335 or 336 are fed to the inputs of each NOR gate 337, 338, 339 or 340 so that logic 0 appears at the output of each NOR gates 337, 338, 339 or 340. Thus, the arithmetic circuit 133 performs the two adding operations including adding operations of segment (1111) and segment (0000) to produce the sum thereof (1111) and the suspense carry (1) and the sum (1111) of the segments.

Assuming now that the carry bit (1) is generated by the carry lookahead circuit 112 of the adder 200 and forwarded to the carry input $CI_3$ of the adder 300, the carry bit $CI_3$ is applied to the NOT gate 341 and inverted to logic 0. This inverted carry bit is applied in parallel to both the NOR gate 345 and the AND gate 349. To each of the other inputs of the NOR gate 345 and the AND gate 349 is applied in parallel logic 0 from the NOR gate 337 which is ANDed with the inverted carry bit by the AND gate 349 and is NORed with the inverted carry bit by the NOR gate 345. Logic 0 and logic 1 appear at the respective outputs of the AND gate 349 and the NOR gate 345 so that the NOR gate 353 performs a NOR operation thereon, producing logic 0 at the output thereof. The non-inverted carry bit $C_3$ is supplied in parallel to the respective inputs of the NOR gates 342 to 344. To another input of each NOR gate 342, 343, or 344 is supplied a logic 0 from one of the NOR gates 337 to 339, which is NORed with the non-inverted carry bit, thereby producing logic 0 at the output thereof. Logic 0 from the NOR gate 342, 343 or 344 and logic 0 from the NOR gate 338, 339 or 340 are applied in parallel to each paired gates. This results in logic 1 at the output of each NOR gate 346, 347 or 348 and logic 0 at the output of each AND gates 350, 351 or 352. If the inputs of each NOR gate 354, 355 or 356 are each equal to logic 1 and each equal to logic 0, then the output of each NOR gate is logic 0.

The carry bit $C_3$ is also supplied to the carry lookahead circuit 113 through the NOT gate 314. The carry bit $C_3$ is inverted to logic 0 and thereafter applied to one of the inputs of the AND gate 309. An AND gate yields logic 1 only when all inputs are each equal to logic 1. The inverted carry bit being applied to the AND gate 309, the output thereof is logic 0. Likewise, each AND gate 310, 311 or 312 produces logic 0 based on each logic 0 from the NOR gate 305, 306 or 307. Thus all the inputs of NOR gate are supplied with logic 0 and thereby producing the carry bit $C_4$ of logic 1. Consequently, the adding operation of the two segments (1111) and (0000) with the carry bit (1) account to the binary number (0000) with the carry bit (1).

On the contrary, if the carry bit $C_3$ is not generated, the outputs of the NOT gate 341 and the NOR gates 342 to 344 are each equal to logic 1 which is carried out together with the output of each NOR gate 337, 338, 339 or 340 with a resultant of logic 0 through each AND operation of the gate 349, 350, 351 or 352 or each NOR operation of the gate 345, 346, 347 or 348. Each gate 353, 354, 355, or 356 performs the NOR operation on the inputs, each logic 0, with a resultant of logic 1.

The carry lookahead circuit 113 carries out the logic operations in parallel with the arithmetic circuit 123. When no carry bit is applied to the NOT gate 314, the gate provides logic 1 to one of the inputs of the AND gate 309. As the NAND gates 305 to 308 provide logic 1 to the inputs of the AND gate, the AND gate 309 produces logic 1 which is supplied to the NOR gate 313. A NOR gate yields logic 1 only when all inputs are logic 0. Therefore, the NOR gate 313 alters its output to logic 0. Consequently, the adding operation on the segments (1111) and (0000) without a carry bit results in the binary number (1111) without a carry bit.

Figure 3:
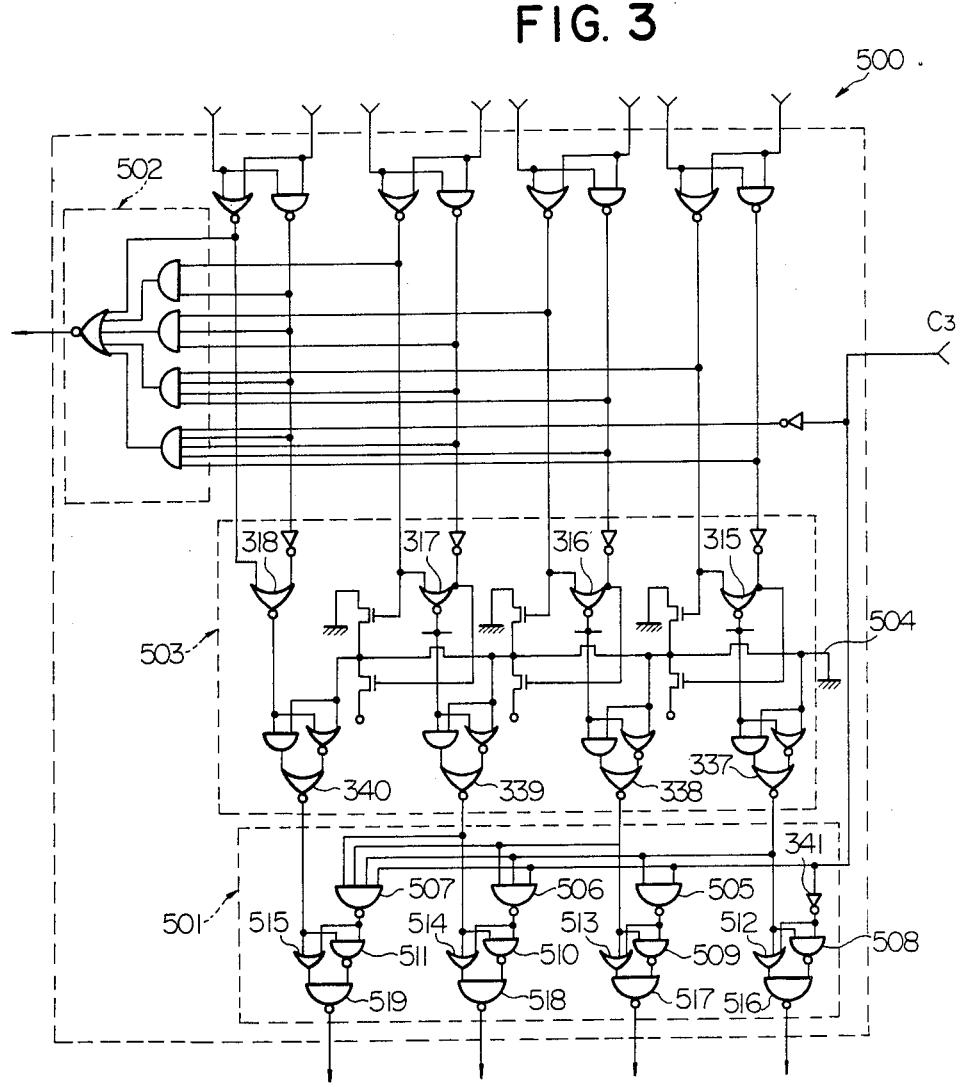
FIG. 3 is a logic diagram showing a modification of the adder shown in FIG. 2.

Referring to FIG. 3 of the drawings, there is shown a modification of the adder according to the present invention. The adder illustrated in FIG. 3 is designated in its entirety by reference number 500 and has the same construction as the adder 300 except for its correction circuit and the connection of the node 133. Therefore, description will be focussed on the construction and the functions of a correction circuit 501.

In FIG. 3, the adder 500 comprises a carry lookahead circuit 502, an arithmetic circuit 503 and the correction circuit 501. The arithmetic circuit 503 has a terminal 504 connected to the ground. The correction circuit 501 has NAND gates 505 to 511 instead of the NOR gates 342 to 348, and OR gates 512 to 515 instead of the AND gates 349 to 352. The correction circuit 501 further has NAND gates 516 to 519 instead of the NOR gates 353 to 356.

The node 504 being thus connected to the ground, the outputs of the NOR gates 337 to 340 are equal in logic state to the outputs of the NOR gates 315 to 318. This means that the arithmetic circuit 503 performs the adding operation on the segments SXi and SYi, but does not add the binary number 1 to the sum of the segments SXi and SYi assuming that no carry bit is forwarded from the carry lookahead circuit of the adder on its right. Under these circumstances, the correction circuit performs the adding operation on the sum of the segments SXi and SYi and the carry bit. If the sum of the segments is represented by the binary number (1111) and concurrently the carry bit, the binary number 1, is forwarded, the carry bit is inverted to logic 0 and NANDed with the output of the NOR gate 337, thereby producing logic 1 by the logic operation of the NAND gate 508. The inverted carry bit is also ORed with the output of the NOR gate 337 by the function of the OR gate 512 for producing at the output thereof, logic 1. The two inputs of the NAND gate 516 are thus each equal to logic 1, and the output thereof is equal to logic 0. The non-inverted carry bit is applied to the input of the NAND gate 505 together with logic 1 from the NOR gate 337, producing logic 0 by the NAND operation thereof. The output of the NAND gate 505 is ORed and NANDed with the output of the NOR gate 338 each producing logic 1 by the function of the OR gate 513 and the NAND gate 509. When these outputs are applied to the NAND gate 517, the NAND gate 517 yields logic 0. Likewise, each NAND gate 518 or 519 yields logic 0 based on the outputs of the NOR gates 337 to 340 and the non-inverted carry bit.

As the carry lookahead circuit 502 generates a carry bit through the same logic operations as the carry lookahead circuit 113, the adder 500 produces the binary number (0000) with the carry bit if the carry bit is forwarded thereto. However, if no carry bit is applied thereto, the adder 500 outputs a binary number (1111) without a carry bit.

The about description is made for the adding operation. However, if one of the binary numbers is the complement of a third number, the arithmetic circuit performs a subtracting operation instead of the adding operation.

As will be understood from the foregoing description, each adder can carry out an arithmetic operation in parallel with a carry lookahead operation, thereby increasing the level of parallelism and resulting in high speed operation. In addition to the high speed operation, the complexity of the circuits is reduced by virtue of the addition of the suspence carry and the correction based on the actual carry bit applied thereto.

What is claimed is:

1. A digital arithmetic unit for first and second binary numbers including a least significant adder and a plurality of adders arranged in cascade, each of said first and second binary numbers being subdivided into a plurality of segments, and
    (a) said least significant adder comprising:
        (1) carry lookahead means operative to produce a first carry signal representative of an actual carry based on one of the segments of said first binary number, a corresponding segment of said second binary number, and a dummy carry signal of value 0;
        (2) adding means operative to add the segment of said first binary number to the corresponding segment of said second binary number for generation of a first partial sum of the segments, said adding means further being operative to add a suspense carry of value 1 to the first partial sum for generation of a first temporary result; and
        (3) final result determination means operative to generate a first final result by subtracting a value 1 from said first temporary result
    (b) each of said adders comprising:
        (1) carry lookahead means operative to produce a second carry signal representative of an actual carry based on another segment of said first binary number, a corresponding segment of said second binary number and said carry signal fed from said least significant adder or said adder located at a lower position thereof,
        (2) adding means operative to add said another segment of said first binary number to the corresponding segment of said second binary number for generation of a second partial sum of the segments, said adding means further being operative to add a suspense carry of value 1 to the second partial sum for generation of a second temporary result, and
        (3) final result determination means operative to generate a second final result by substracting a value 0 from said second temporary result in the presence of said carry signal and by subtracting a value 1 from said second temporary result in the absence of said carry signal.

2. A digital arithmetic unit as set forth in claim 1 wherein each segment of said first and second numbers is constituted by a predetermined number of bits.

3. A digital arithmetic unit as set forth in claim 2, wherein said segment is constituted by four bits.

4. A digital arithmetic unit as set forth in claim 1, wherein said second binary number is the complement of a third number.

5. A digital arithmetic unit for first and second binary numbers including a least significant adder and a plurality of adders arranged in cascade, each of said first and second binary numbers being subdivided into a plurality of segments,
    (a) said least significant adder comprising:
        (1) carry lookahead means operative to produce a carry signal representative of an actual carry based on one of the segments of said first binary number, a corresponding segment of said second binary number, and a dummy carry signal of value 0;
        (2) adding means operative to add the segment of said first binary number to the corresponding segment of said second binary number for generation of a first partial sum of the segments, said adding means further being operative to add a suspense carry of value 0 to the first partial sum for generation of a first temporary result, and (3) final result determination means operative to generate a first final result by substracting a value 0 from said first temporary result, (b) each of said adders comprising:

(1) carry lookahead means operative to produce a carry signal representative of an actual carry based on another segment of said first binary number, a corresponding segment of said second binary number and said carry signal fed from said least significant adder or said adder located at a lower position thereof;

(2) adding means operative to add the segment of said first binary number to the corresponding segment of said second binary number for generation of a second partial sum of the segments, said adding means further being operative to add a suspense carry of value 0 to the second partial sum for generation of a second temporary result; and (3) final result determination means operative to generate a second final result by adding a value 1 to said second temporary result in the presence of said actual carry and by adding a value 0 to said second temporary result in the absence of said actual carry.

* * * * *

UNITED STATES PATENT AND TRADEMARK OFFICE
CERTIFICATE OF CORRECTION

PATENT NO. : 4,761,760

DATED : 8/2/88

INVENTOR(S) : Tomoji

It is certified that error appears in the above-identified patent and that said Letters Patent is hereby corrected as shown below:

Column 1, line 42, delete "conductive", insert --conducive--;

Column 3, line 33, delete "lookhead", insert --lookahead--.

Signed and Sealed this

Twenty-fourth Day of September, 1991

Attest:

HARRY F. MANBECK, JR.

Attesting Officer

Commissioner of Patents and Trademarks